July 19, 1966 R. T. KEATING Re. 26,063

HIGH VELOCITY OVEN

Original Filed July 24, 1959 2 Sheets-Sheet 1

INVENTOR.
Richard T. Keating
BY
L. F. Hammond,
Atty.

HIGH VELOCITY OVEN

Original Filed July 24, 1959 2 Sheets-Sheet 2

INVENTOR.
Richard T. Keating
BY
L. F. Hammond
Atty.

United States Patent Office

Re. 26,063
Reissued July 19, 1966

26,063
HIGH VELOCITY OVEN

Richard T. Keating, 144 N. Cuyler Ave., Oak Park, Ill.

Original No. 3,074,393, dated Jan. 22, 1963, Ser. No. 829,408, July 24, 1959. Application for reissue Jan. 15, 1965, Ser. No. 440,973
4 Claims. (Cl. 126—21)

Matter enclosed in heavy brackets [ ] appears in the original patent but forms no part of this reissue specification; matter printed in italics indicates the additions made by reissue.

This invention relates to an improved roasting and baking oven and more particularly to an improved roasting and baking oven utilizing high velocity air flow to accomplish more rapid and uniform heating.

In the use of roasting and baking ovens, one of the principal concerns is the achievement of substantial uniformity of temperature throughout the oven. Indeed, the quality of the finished product is inextricably related to the uniformity of oven temperature.

Therefore it is a primary object of this invention to provide a roasting and baking oven utilizing tremendous turbulence to provide substantially uniform temperature throughout and which minimizes the transfer of heat by radiation to produce high quality roasted and baked products.

In roasting and baking ovens another principal concern is producing a final product which is not partially dehydrated but which maintains a large proportion of moisture. Not only does dehydration rob the product of taste but because of the resultant shrinkage also tends to produce a product of undesirable appearance.

Therefore, it is a further object of this invention to provide a roasting and baking oven having a substantially uniform temperature throughout which yields a final product retaining a large proportion of moisture, and in which a round of beef, for example, may be roasted with a shrinkage of only 10% to 18% as contrasted with a shrinkage of 36% or more in conventional oven equipment.

A critical problem in producing roasted and baked goods results from the necessity of producing large quantities of such products in sufficient time to insure delivery while either fresh or warm. The solutions to this problem were previously restricted because slow baking and roasting were thought to be essential to producing high quality roasted and baked products.

However, with roasting and baking ovens operating on the principle of low temperature, slow heating, numerous ovens are necessitated, much floor space utilized and much multiplication of fuel and supervisory costs incurred in order to produce the desired quantity by the critical delivery time.

Therefore, it is a further object of this invention to provide a roasting and baking oven for more rapidly producing a large quantity of baked and roasted products of high uniform quality and in which baking and roasting time is reduced by 40% of that required by presently used ovens when the same temperatures are used.

It is a further object of this invention to provide an improved method of rapidly producing baked and roasted products of high uniform quality which retain a high proportion of moisture.

Other objects of the invention are to provide a roasting and baking oven utilizing an arrangement facilitating assembly and repair, which provides a high ratio of useable oven capacity in relation to the overall oven size, which maximizes heat transfer to the air stream within the oven, which maximizes turbulence and minimizes the effect of radiant heat to obtain rapid, substantially uniform heating of the products.

Further objects and advantages of this invention will become evident from an examination of the particular description and the drawings in which.

Figure 1:
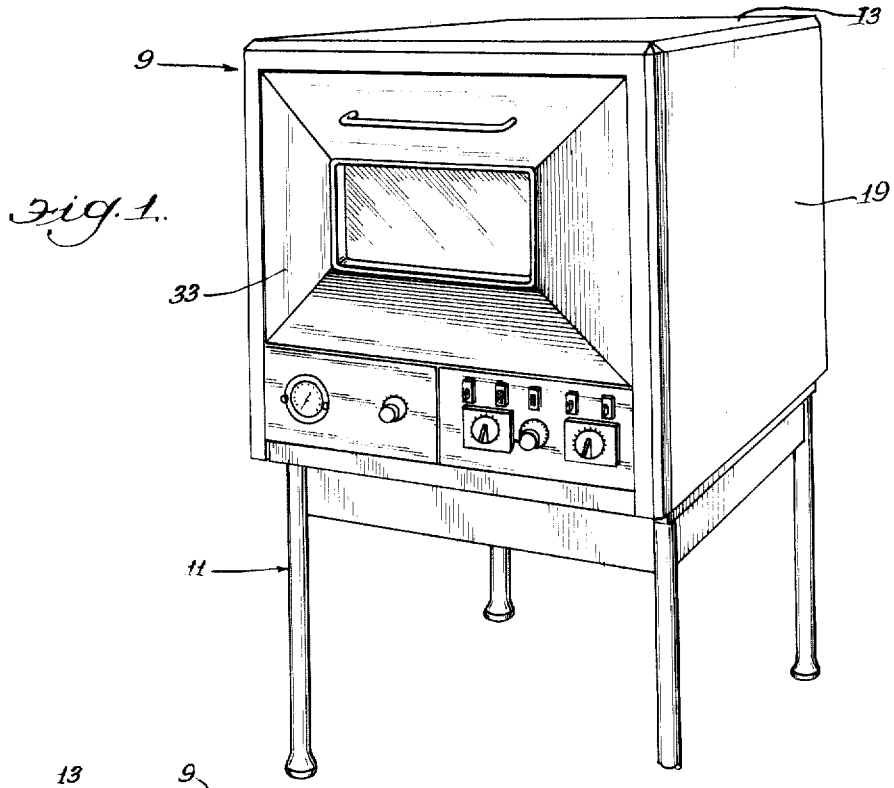
FIGURE 1 is a perspective view of an embodiment of the subject invention.
Figure 3:
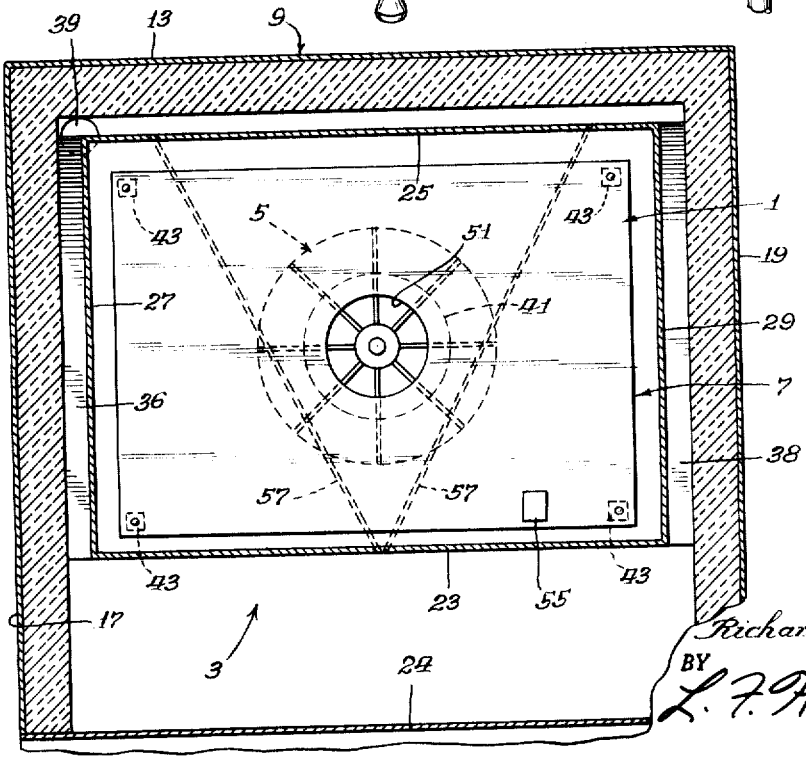
FIGURE 3 is a sectional front view of the embodiment shown in FIGURE 2 taken substantially on the plane of line 3—3 in FIGURE 2.
Figure 2:
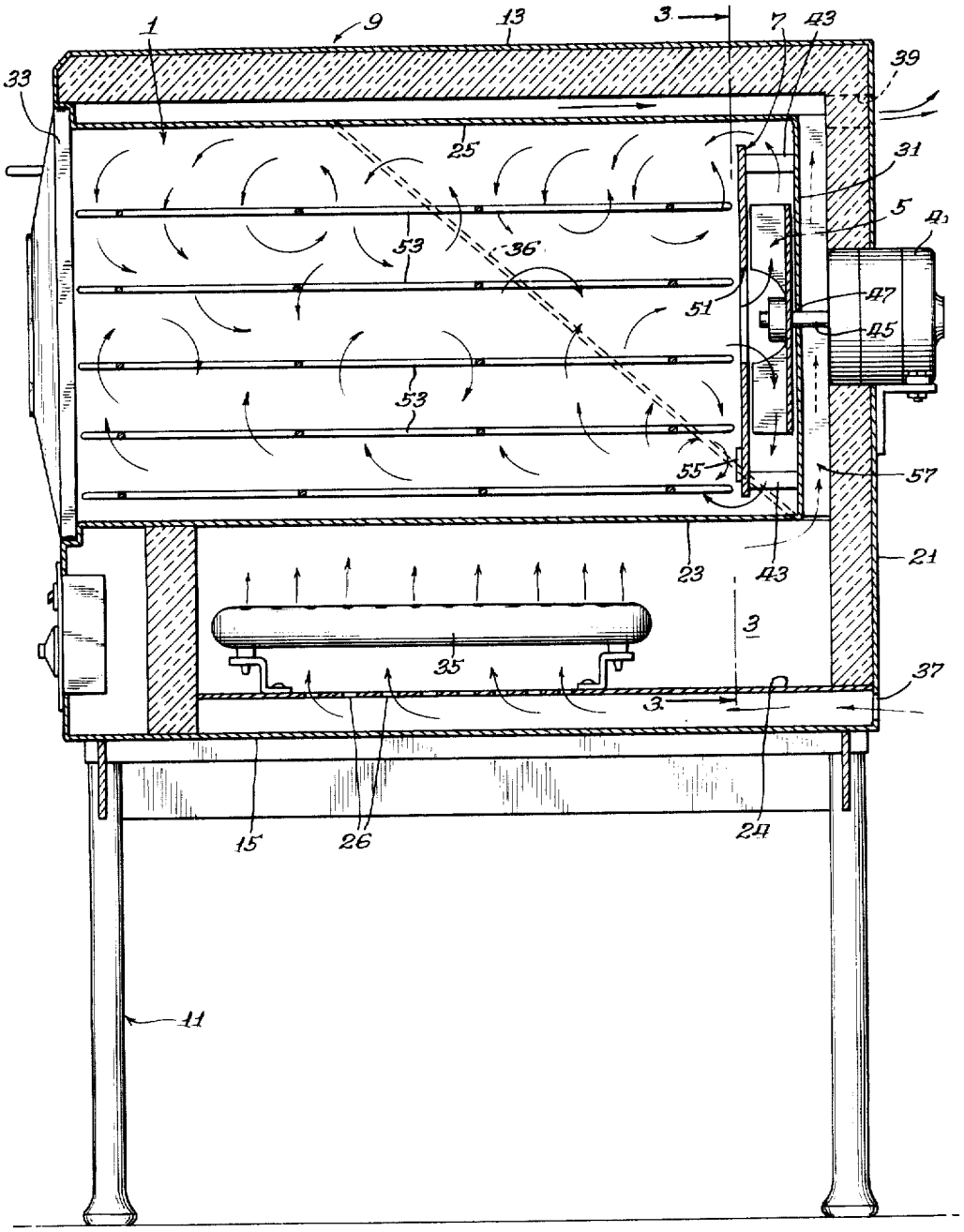
FIGURE 2 is an enlarged sectional side view of the embodiment shown in FIGURE 1.

In FIGURE 2 it is seen that the high velocity roasting and baking oven is comprised generally of a closed oven chamber 1, a continuous heating chamber 3, a high speed impeller 5, and a baffle plate 7.

The structure defining the two chambers consists of a double walled cabinet 9 shown mounted on a metal rack 11. The cabinet 9 is composed of outer insulated top 13, bottom 15, insulated sides 17, 19, and an insulated end 21 walls which are spaced from the corresponding interior bottom 23, top 25, side 27, 29, and end 31 walls to form the continuous heating chamber 3. The interior walls and the glass paneled double walled door 33 combine to form the closed oven chamber 1. The outer bottom wall 15 is spaced from the interior lower wall 23 sufficiently to permit reception of a gas burner 35 or an equivalent means for heating the air in the continuous heating chamber 3. Gas burner 35 is spaced from the interior bottom wall 23 since the location of the gas burner is primarily to heat the air in the continuous chamber 3 and not to heat the lower surface of interior lower wall 23. Gas burner 35 is mounted on an inlet support plate 24 spaced from lower outer wall 15 and provided with apertures 26 immediately below the burner 35. Guide baffles 36 and 38 are located between the insulated outer walls 17 and 19 and the inner walls 27 and 29. These baffles are angled forwardly and upwardly from the lower rear corner of the closed oven chamber to the top edge of the chamber at a point approximately one-third of the distance from the front to the rear of the oven. The purpose of these baffles is to force the heated air forwardly and upwardly to provide adequate heat exchange with the entire surface of the walls before the heated air is expelled. That portion of the side walls behind the baffle is provided with heated air which is directed around the walls by the action of the V-shaped baffle 57. This baffle, which extends upwardly and outwardly, straddling the drive shaft and motor housing, has its lowermost vertex portion at a level with the interior bottom wall 23 of the oven chamber and the uppermost bifurcations extending to a position level with the top inner wall 25 of the oven chamber. This baffle not only serves to protect the motor from undue heat but also serves to force the heated air around the side walls behind baffle guides 36 and 38. The location of the burner in the lower portion of the oven and above apertures 26 causes all of the air entering the opening 37 in end wall 21 to be heated before rising into the spaces between the inner and outer side and end walls where it is slowed and directed by the guide baffles 36, 38 and 57 until forced out through rear upper vent 39. Vent 39 not only serves to prevent pressure buildup within the continuous heating chamber 3 but also serves to insure constant circulation of heated air to provide a substantially uniform temperature throughout the continuous heating chamber 3.

Centrifugal impeller 5 is located within the closed oven chamber 1 adjacent the interior end wall 31 and is driven by means of a motor 41 mounted on the end wall 21 of the oven, and connected to the impeller by a drive shaft 45 extending through aperture 47 in the interior end wall 31. The motor 41 is of sufficient power to drive the air within the chamber at speeds ranging from ten to fifty miles an hour and preferably in the upper portion of this range for best results. It has been found that air speeds of less than ten miles an hour do not result in sufficient turbulence to insure rapid uniform heating and air speeds in excess of fifty miles an hour tend to scorch the trailing edges of the products. The location of the impeller within the closed oven chamber insures the creation of maximum air speed by obviating impeding friction created by external ducts and emphatically increases the turbulence of the air flow thus assuring a high degree of temperature uniformity.

A generally rectangular baffle plate 7 is secured to the oven by means of spacing bars 43 and is located in front of and substantially parallel to the plane of rotation of the centrifugal impeller 5. The edges of the baffle plate 7 are relatively sharp and are spaced from the corresponding interior walls 23, 25, 27, and 29 of the oven chamber to form a duct permitting the air driven outwardly by the impeller to be forced from right to left as viewed in FIGURE 2 into the remainder of the chamber. The proximity of the baffle to the impeller and the location of the baffle edges serve to create a high degree of turbulence as is indicated by the arrows in FIGURE 2.

Baffle plate 7 is formed with a centrally disposed circular aperture 51 which permits the air to circulate centrally into centrifugal impeller 5. The central location of aperture 51 in the arrangement shown has an additional advantage in that the turbulent air in the central portion of the oven is at the furthermost point from any of the heated walls and hence, is the coolest air in the oven. Thus, the central opening serves to insure the recirculation of the cooler air through the impeller and outwardly into practically instantaneous contact with the heated walls.

One particular advantage of the oven as described is that either grated shelving 53, such as wire racks, may be used or flat deck shelving, such as sheet metal shelving, may be used with equal facility to further broaden the applicability of the oven to the baking and roasting of a wide variety of products.

A thermostatic control shown generally at 55 is in partial metal to metal contact on the baffle plate 7 and controls the gas burner 35. An appropriate control for this purpose is the one shown in applicant's prior Patent No. 2,846,147, dated August 5, 1958.

In operation the gas burner is ignited and the oven preheated in preparation for receiving food products for roasting or baking. As the heated air in the lower portion of chamber 3 rises, air is pulled in through opening 37 for heating by the burner. The rising heated air flows upwardly on each side of the oven chamber through the spaces between the inner and outer walls and is directed and slowed in its travel by guide baffles 36 and 38 to assure uniform heating of the interior walls. Simultaneously air is being directed around the motor and drive shaft by the V-shaped baffle 57 which also serves to slow the upward rise of the airflow to permit effective heat exchange with the interior end wall and to force heated air around, behind directional baffles 36 and 38 to complete the heating of the side walls. When the air reaches the uppermost portion of chamber 3 the heated air is forced through vent 39.

Centrifugal impeller 5 is meanwhile rotated to extremely high speeds by the motor 41 acting through drive shaft 45. Impeller 5 impels the air radially outwardly toward the interior side, top and bottom walls, the heated end wall preventing the air from losing its temperature as it is moved through the impeller. As the air pressure builds up behind the baffle 7 the air is forced to move from right to left as viewed in FIGURE 2 through the space between the edges of the baffle 7 and the interior walls. Due to the extremely high speed of the impeller and also to the sharp edges of the baffle, the air stream emerges from the aforementioned space in an extremely turbulent manner, the random eddy currents thus produced rapidly distributing the air throughout the oven into contact with the heated walls, and back into the central portion of the oven from where it is returned to the centrally disposed aperture 51 of baffle plate 7. This distribution is so effective that in actual use the point to point temperature variation within applicant's oven is never more than 4 degrees.

When the oven is sufficiently preheated, the food products are placed on the shelving 53 and the foregoing process continued until the products are cooked.

It is to be particularly noted that although the food product on the top shelf would be the recipient of radiant heat from the interior top wall, this product would act as a shield preventing the products on lower shelves from receiving this radiant heat. Further, if these products were staggered so that the products on lower shelves could receive radiant heat this heat would be diminished in view of the fact that the effect of radiant heat is inversely related to the square of the distance from the radiant surface. However, in the invention of the applicant the effects of radiant heat are reduced to a minimum by the tremendous velocity and turbulence which are introduced into the oven. This tremendous velocity and turbulence assures that the heat transfer due to convection overshadows the heat transfer due to radiation, not only because of the proportionately larger quantity of heat available for exchange by convection but also because such a rapid heat exchange between the air stream and the oven walls is achieved that the temperature differential between the oven walls and the body of air within the oven is significantly minimized. Since radiation is related to the fourth power of temperature, in reducing these oven walls to within a relatively narrow range of temperature as compared to the oven atmosphere, the radiant heat is diminished greatly and, due to the turbulence the convected heat is increased greatly.

Also, when the food products are initially placed into the preheated oven, the heated air flow takes on a certain portion of the moisture from the products. However, since the oven is closed and enjoys an extremely favorable ratio between oven volume and oven product capacity, the heated air stream soon becomes saturated with moisture and is incapable of taking on more. Thus the products can only be dried to the extent necessary to saturate the air stream in the closed oven.

Therefore it can be seen from the foregoing description that applicant's roasting and baking oven utilizes an arrangement and combination of elements assuring a substantially uniform temperature throughout the oven, which yields a moist baked or roasted product, which more rapidly produces baked and roasted products of high uniform quality, which utilizes heat by convection to heat the product while drastically minimizing heat by radiation, and which is relatively uncomplicated, and inexpensive to manufacture, use and repair, and a method which provides more rapid production of baked and roasted goods of high uniform quality which retain a high proportion of moisture.

I claim:

*1*. A roasting and baking oven comprising (a) a closed rectangular oven chamber having top, bottom, side and end walls, (b) a continuous heating chamber spaced from and surrounding the top, bottom, sides and one end wall of said closed oven chamber, said heating chamber including heating means in the lower portion thereof, (c) a centifugal impeller mounted within said oven chamber adjacent said one end wall and parallel therewith, (d) means for driving said impeller, and (e) a flat rectangular baffle plate lying completely in a single plane adjacent and substantially parallel with said impeller on the side thereof opposite said one end wall, (1) said baffle plate having
a central opening for air to be pulled axially into said impeller from said oven chamber, (2) and the peripheral edges of said baffle plate being square to the plane of one face thereof and spaced from the respective opposing walls of said oven chamber sufficiently to cause air moving radially outward from said impeller between the baffle and said one wall to turn sharply over the said edges to enter into said oven chamber along said opposing walls in violently turbulent condition.

*2. A roasting and baking oven comprising a closed oven chamber having top, bottom, side and end walls, a heating chamber having walls spaced from and surrounding the top, bottom, and sides of said closed oven chamber, said heating chamber including means for heating the walls of said oven chamber, a centrifugal impeller mounted within said oven chamber adjacent one end wall and parallel therewith, means for driving said impeller, and a generally flat baffle plate mounted in said oven chamber adjacent and substantially parallel with said impeller on the side thereof opposite said one end wall, said baffle plate having a central opening for air to be pulled axially into said impeller from said oven chamber and having its peripheral edges projecting toward the adjacent oven chamber walls with at least the opposite side edges spaced from the respective opposing walls of said oven chamber sufficiently to cause air moving radially outward from said impeller between the baffle plate and said one end wall to turn sharply over the said side edges and enter into said oven chamber along said opposing walls in a violently turbulent condition, said baffle plate opening having an area not greater than that of a circle defined by the radius of the impeller.*

*3. A high velocity roasting and baking oven comprising a closed rectangular oven chamber having top, bottom, side and end walls, a cabinet having walls spaced from the walls of said oven chamber to provide a heating chamber surrounding the top, sides and bottom of said oven chamber, means in said heating chamber for heating the walls of said oven chamber, a centrifugal impeller mounted within said oven chamber adjacent one end wall thereof and parallel therewith, means for driving said impeller, and a generally flat rectangular baffle plate mounted in said oven chamber adjacent and substantially parallel with said impeller on the side thereof opposite said one end wall, said baffle plate having an opening of an area less than that of a circle defined by the radius of the impeller for air to be pulled axially into said impeller from said oven chamber and having peripheral edges projecting toward the adjacent oven chamber walls and spaced therefrom sufficiently to cause air driven radially outward from said impeller between the baffle plate and said one end wall to turn sharply over the said peripheral edges and enter into said oven chamber along said adjacent walls in a violently turbulent condition.*

*4. A high velocity roasting and baking oven comprising a closed rectangular over chamber having top, bottom, side and end walls, a heating chamber surrounding the top, bottom and sides of said closed oven chamber and defined by walls spaced therefrom a centrifugal impeller mounted within said oven chamber adjacent and parallel with one wall thereof, means for driving said impeller a generally rectangular baffle plate mounted in said oven chamber adjacent and substantially parallel with said impeller on the side thereof opposite said one wall, said baffle plate having an opening for air to be pulled axially into said impeller from said oven chamber and having its peripheral edges projecting toward the adjacent oven chamber walls, said baffle plate opening having an area not greater than that of a circle defined by the radius of the impeller, opposite side edges of the baffle plate being spaced from the respective opposing walls of the oven chamber sufficiently to cause air moving radially outward from said impeller between the baffle plate and said one wall to turn sharply over the said side edges and become violently turbulent as it enters into the oven chamber along said opposing walls, and means in said heating chamber for heating the top, bottom, and side walls of said oven chamber.*

References Cited by the Examiner

The following references, cited by the Examiner, are of record in the patented file of this patent or the original patent.

UNITED STATES PATENTS

| | | | |
|---|---|---|---|
| 525,760 | 9/1894 | Koch | 126—19 |
| 1,867,737 | 7/1932 | Fletcher | 263—40 X |
| 1,946,963 | 2/1934 | Brouillet | 126—20 |
| 2,168,028 | 4/1939 | Harsch | 266—5 |
| 2,339,365 | 1/1944 | Van Guilder | 263—42 |
| 2,408,331 | 9/1946 | Mills | 126—21 X |
| 2,417,842 | 3/1947 | Sanford et al. | 126—21 X |
| 2,490,076 | 12/1949 | Maxon | 219—35 |
| 2,627,265 | 2/1953 | Tate | 126—106 |
| 2,680,189 | 6/1954 | Williams | 219—39.1 |
| 2,957,067 | 10/1960 | Scofield | 126—21 |

FOREIGN PATENTS

| | | |
|---|---|---|
| 545,433 | 3/1956 | Belgium. |
| 1,124,382 | 6/1956 | France. |
| 23,121 | 1906 | Great Britain. |
| 332,874 | 7/1930 | Great Britain. |

FREDERICK L. MATTESON, Jr., *Primary Examiner.*

E. G. FAVORS, *Assistant Examiner.*